May 4, 1948. V. GEORGIAN ET AL 2,441,019
LIGHT-POLARIZING SUSPENSION OF ORIENTED CRYSTALS OF
DIBENZACRIDINE PERIODIDE IN CELLULOSE ACETATE
Filed Dec. 16, 1943
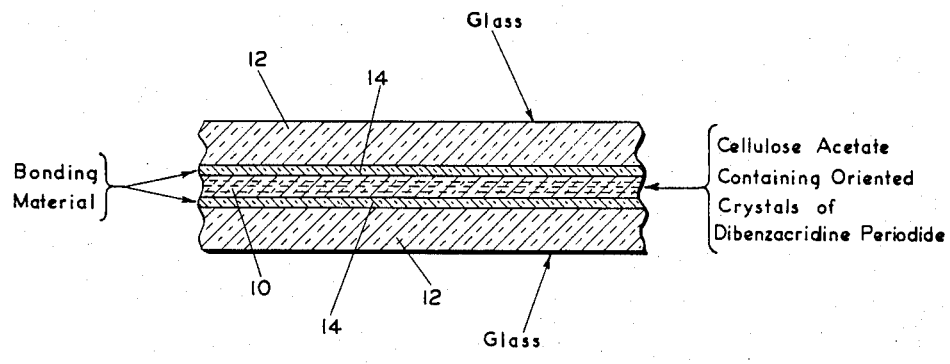
INVENTORS
BY
Attorney Patented May 4, 1948

2,441,019

UNITED STATES PATENT OFFICE 2,441,019

LIGHT-POLARIZING SUSPENSION OF ORIENTED CRYSTALS OF DIBENZACRIDINE PERIODIDE IN CELLULOSE ACETATE

Vlasios Georgian, Quincy, William F. Amon, Jr., Roxbury, Ralph Gofstein, Haverhill, and Edwin H. Land, Cutler D. West, and Robert B. Woodward, Cambridge, Mass., assignors to Polaroid Corporation, Cambridge, Mass., a corporation of Delaware Application December 16, 1943, Serial No. 514,458

3 Claims. (Cl. 88—65)

This invention relates to a new and improved light-polarizing material and the process of making the same.

It is one object of the present invention to provide sheet light-polarizing material comprising a suspension of optically oriented, asymmetric crystals in a light-transmitting set suspending medium, and more particularly to provide such polarizing material wherein said crystals comprise a periodide of dibenzacridine of the formula

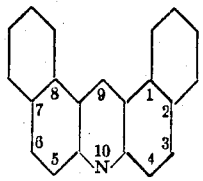

Another object of the invention is to provide sheet polarizing material comprising a suspension in a light transmitting suspending medium of optically oriented, asymmetric, dichroic crystals comprising addition products of iodine and 1.2-7.8 dibenzacridine and/or one or more of the reduction stages of 1.2-7.8 dibenzacridine.

Further objects are to provide sheet polarizing material of the above type wherein the suspending material is cellulosic and particularly cellulose acetate, to provide such polarizing material wherein the crystals comprise addition products of iodine, 1.2-7.8 dibenzacridine and an acidic substance, particularly a mineral acid such as phosphoric acid, and to provide such sheet polarizing material bonded between light-transmitting protective layers of hard material such as glass.

Still further objects are to provide a process for manufacturing light-polarizing material of the characteristics outlined above, and particularly to provide such a process wherein an organic nitrogen base comprising 1.2-7.8 dibenzacridine and/or one or more of the reduction stages of 1.2-7.8 dibenzacridine, particularly 1.2-7.8 hydrodibenzacridine, is reacted with iodine to form asymmetric dichroic crystals, to provide such a process wherein said reaction is carried out in the presence of an acidic substance such particularly as a mineral acid or an inorganic acid salt, and to provide such a process in which a portion of the suspending medium for the dichroic crystals of the invention is mixed with said organic nitrogen base before said crystals are precipitated.

Additional objects and advantages will in part appear and in part be pointed out in the course of the following detailed description of one or more embodiments of the invention, which are given as non-limiting examples, in connection with the accompanying drawing, which is a diagrammatic view in section of a laminated light-polarizer embodying a form of the invention.

It has for some time been known to produce light-polarizing material in sheet form by suspending a multiplicity of dichroic, microcrystalline particles in a sheet of light-transmitting plastic material and orienting the polarizing axes of said particles in substantial parallelism. Among the dichroic particles heretofore found suitable are the periodides derived from cinchona alkaloids, particularly quinine and cinchonidine (U. S. Patents Nos. 2,078,254 and 2,289,713), and certain inorganic periodides such as purpureocobaltchloridesulfateperiodide (U. S. Patent No. 1,956,867). In accordance with the present invention, it has been discovered that highly satisfactory sheet polarizing material may be produced from a suspension of dichroic, asymmetric particles comprising a periodide of dibenzacridine of the formula

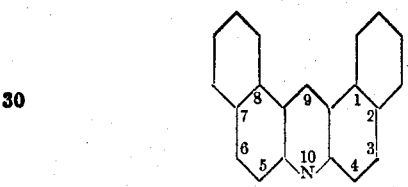

or what may possibly be more accurately described as an addition compound of iodine and 1.2-7.8 dibenzacridine and/or one or more of the reduction stages of 1.2-7.8 dibenzacridine.

In one illustrative example of the novel product and process of the present invention, the first step is to prepare the desired organic nitrogen base. Ten parts of 2-naphthol and ten parts of 2-naphthylamine may be melted together, and heating of the resulting melt should be continued as, for example, in an oil bath, until a temperature of the order of 155-165° C. is reached. While the temperature is maintained at this range, small amounts of trioxymethylene may then be added gradually up to a total of three parts. The mixture should be thoroughly stirred after each addition because the reaction may otherwise generate heat too rapidly and become violent. The mix should then be permitted to cool and should preferably be broken up while cooling in order to prevent it from becoming too hard. The resulting product may then be used for the production of polarizing material in accordance with the invention, but may preferably first be purified by recrystallizing from xylene.

The product of the above steps is chiefly a multiplicity of fine orange crystals consisting of 1.2–7.8 dibenzacridine and one or more of the reduction stages of 1.2–7.8 dibenzacridine. Its exact chemical structure has not been definitely determined, but it is believed to be primarily a quinhydrone type of compound consisting of the first reduction stage of 1.2–7.8 dibenzacridine and will accordingly be termed hereinafter and in the claims "1.2–7.8 hydrodibenzacridine." It appears, moreover, that the product of the above step may include also some 1.2–7.8 dibenzacridine and some further reduction stages thereof, particularly 1.2–7.8 dihydrodibenzacridine. By far the greater portion of the product, however, consists of the orange crystals of 1.2–7.8 hydrodibenzacridine.

The next step in the process of the invention is to treat the product of the above steps with iodine in order to produce the desired dichroic crystals. This is preferably carried out by first forming a solution of the base and then adding iodine thereto. It also appears desirable to add to the solution of the base a relatively small amount of the plastic material in which it is ultimately desired to suspend the crystals. Many plastic materials are suitable for this purpose such, for example, as various cellulosic derivatives such as cellulose acetate and cellulose nitrate, and vinyl compounds such as vinyl acetals. Cellulose acetate has been found particularly useful in commercial products. A wide variety of solvents may also be used during this step of the invention provided that the chosen solvent be a solvent for the base and be capable of dissolving or dispersing the plastic suspending medium but should be substantially a non-solvent of the desired dichroic crystals. When cellulose acetate is used as the suspending medium, a solution comprising from three to five parts of ethyl acetate and one part of methanol will be found particularly advantageous as a solvent, although many other solvents may be used such, for example, as acetone, carbon tetrachloride, and chlorinated solvents such as chloroform, or ethylene chloride.

In one form of the invention 0.32 gram of 1.2–7.8 hydrodibenzacridine prepared as outlined above and 16 grams of cellulose acetate may be dissolved in 112 cc. of a solution comprising 5 parts ethyl acetate to 1 part methanol and thoroughly stirred until the mix is of a consistency more or less like honey. There may then be added thereto 0.5 cc. of concentrated (85%) phosphoric acid and 11.9 cc. of a solution formed by dissolving 16 grams of crystalline iodine in 500 cc. of methanol. A gel forms comprising a precipitate of colloidal dichroic particles, and at the same time a color change occurs from the yellow-orange of the initial solution to a relatively dark brownish violet. The mixture should be stirred until the reaction is complete. An additional 64 grams of cellulose acetate may then be added and the whole mass thoroughly mixed, preferably for approximately one half-hour. Thereafter it may be treated in any desired way to form a sheet in which the suspended dichroic particles are optically oriented as, for example, by extruding through an orifice, smearing, stretching or the like.

The presence of an acidic substance during the above iodine reaction appears of importance in controlling the size, shape and stability of the precipitated crystals. It is desirable not only that said crystals be as stable as possible to heat, but also that they be needle-like in shape and as small as possible. For example, preferred results from the standpoint of crystal size may be obtained with phosphoric acid, and said crystals will also be highly stable. Crystals of even greater stability may be obtained by using sulfuric acid, although the size of such crystals tends to be greater than in the case of phosphoric acid. This increased size, however, is immaterial for some uses of the polarizing material, and sheets made with sulphuric acid are particularly useful, for example, when used in close conjunction with a light source, in view of the extreme stability of said material to heat. Other mineral acids may also be used such, for example, as phosphorus acid, as well as inorganic acid salts, particularly sulphates and phosphates such, for example, as sodium bisulphate or sodium dihydrogen phosphate, and salts of weak bases and strong mineral acids, for example, copper sulphate. The quantity of acid used does not appear critical nor is the time of adding it to the solution, provided, however, that it is preferably not added after the iodine. It has not been determined whether the acid present in the crystal-forming reaction actually enters into the crystal structure or merely influences the crystal habit and properties. It is intended, therefore, that all claims containing limitations to acidic substances shall be construed as covering both possibilities.

The concentration of iodine in the reacting solution of the invention does not appear to be critical, but from the standpoint of efficiency of the product the preferred iodine concentration will be such as to give a ratio of substantially two iodine atoms for every atom of nitrogen. It should also be noted that the order of mixing the various components used in the process of the invention is not critical, although the order given in the foregoing example appears to be preferred. On the other hand, it is of substantial importance that the concentration of iodide ions in the reacting solution be carefully controlled since an excess of iodide ions appears to favor the precipitation of particles other than the desired dichroic crystals. This problem does not appear to arise in the case of 1.2–7.8 dibenzacridine alone, but when one of its reduction stages is used, it is readily oxidized by the iodine with the formation of hydrogen iodide which then ionizes. It appears that the concentration of iodide ions produced in this way in the process of the invention, although not desirable, may be tolerated. However, when the process is carried out in metallic equipment, particularly in the case of ferrous metals, the iodine appears to react with said metal to form iodides which in turn ionize and thus increase the iodide ion concentration beyond the tolerable range. It is desirable, therefore, particularly when such metallic equipment is used, to add to the reacting solution a compound capable of lowering the iodide ion concentration, as for example by forming an insoluble iodide or by the formation of soluble undissociated complex ions. An example of such a compound is neutral lead acetate, and a suitable quantity in the foregoing example is approximately .07 gram, which is preferably added to the reacting solution prior to the iodine.

Numerous variations may be made in the foregoing process without departing from the scope of the invention and without materially affecting the nature of the product. For example, it appears that substantially the same polarizing crystals are obtained regardless of whether the base used is pure 1.2-7.8 dibenzacridine, one or more of the reduction stages of 1.2-7.8 dibenzacridine, or a mixture of 1.2-7.8 dibenzacridine and one or more of its reduction stages. Furthermore, other compounds of 1.2-7.8 dibenzacridine such as the quaternary salts of 1.2-7.8 dibenzacridine may also be used for the purposes of the invention, but it appears that the resulting product is substantially identical with that obtained from 1.2-7.8 dibenzacridine and that no advantage is derived from the intermediate step. For example, an addition compound of iodine and methosulphate of 1.2-7.8 dibenzacridine appears substantially identical with the addition compound of iodine and 1.2-7.8 dibenzacridine produced by the above described process. It is to be understood that all such modifications are to be construed as coming within the scope of the invention.

Sheet polarizing material produced in accordance with the invention will be found satisfactory for virtually any use to which the sheet polarizing materials of the prior art have been subjected. It is particularly useful under conditions of heat or moisture, for the reason that it is substantially more stable to the effects of both heat and moisture than are polarizers made from the cinchona alkaloids. For many purposes it may be desirable to provide outer protective layers for the polarizing sheet. As shown in the drawing, polarizing layer 10 may be bonded between a pair of sheets 12 of glass or hard, light-transmitting plastic, such for example as methyl methacrylate, by means of two layers 14 of adhesive. If the suspending medium in film 10 is cellulose acetate and layers 12 are glass, the preferred adhesive used in layers 14 will be a polymerized, incomplete polyvinyl acetal resin plasticized with glycerol triricinoleate (unoxidized castor oil). Another useful structure may be obtained by bonding polarizing film 10 between a pair of thicker sheets of cellulose acetate containing no polarizing particles. The same plasticized polyvinyl acetal resin may be used in this case, or the sheets may be bonded directly together by first moistening their contacting surfaces with acetone or another suitable volatile solvent. Many other similar modifications and variations of the invention will undoubtedly be apparent to those skilled in the art.

Since certain changes in carrying out the above process, and certain modifications in the product which embody the invention may be made without departing from its scope, it is intended that all matter contained in the above description or shown in the accompanying drawing shall be interpreted as illustrative and not in a limiting sense.

What is claimed is:

1. A light-polarizing sheet comprising a light-transmitting set suspending medium of cellulose acetate and a multiplicity of dichroic particles, needle-like in shape and substantially colloidal in size, of an acid periodide of 1.2-7.8 dibenzacridine suspended in said cellulose acetate with their polarizing axes oriented in substantial parallelism.

2. A light-polarizing sheet comprising a light-transmitting set suspending medium of cellulose acetate and a multiplicity of dichroic particles, needle-like in shape and substantially colloidal in size, of phosphoric acid periodide of 1.2-7.8 dibenzacridine suspended in said plastic material with their polarizing axes oriented in substantial parallelism.

3. A light-polarizing sheet comprising a light-transmitting set suspending medium of an organic plastic material from the class consisting of cellulose acetate and cellulose nitrate, and a multiplicity of dichroic particles, needlelike in shape and substantially colloidal in size, of an acid periodide of 1.2-7.8 dibenzacridine suspended in said plastic material with their polarizing axes oriented in substantial parallelism.

VLASIOS GEORGIAN.
WILLIAM F. AMON, Jr.
RALPH GOFSTEIN.
EDWIN H. LAND.
CUTLER D. WEST.
ROBERT B. WOODWARD.

REFERENCES CITED

The following references are of record in the file of this patent:

UNITED STATES PATENTS

| Number | Name | Date |
|---|---|---|
| 1,918,848 | Land | July 18, 1933 |
| 1,956,867 | Land | May 1, 1934 |
| 1,989,371 | Land | Jan. 29, 1935 |
| 2,011,553 | Land | Aug. 13, 1935 |
| 2,041,138 | Land | May 10, 1936 |
| 2,078,254 | Land | Apr. 27, 1937 |
| 2,123,902 | Land | July 19, 1938 |
| 2,168,221 | Land | Aug. 1, 1939 |
| 2,233,941 | Fix | Mar. 4, 1941 |
| 2,256,403 | McNally et al. | Sept. 16, 1941 |
| 2,289,712 | Land et al. | July 14, 1942 |
| 2,289,713 | Land | July 14, 1942 |

FOREIGN PATENTS

| Number | Country | Date |
|---|---|---|
| 493,775 | Great Britain | Oct. 13, 1938 |

OTHER REFERENCES

Proc. Roy. Soc. Edinburgh, 50, pt. 3, pp. 243-61 (1930.)

J. Chem. Soc. of London, 85, pp. 1205-10.

The London Philosophical Magazine and Journal of Science, 1852, Mar., page 161, Sept. 186 to 192; Nov. 1853, pages 346 to 351; May 1854, pages 352 to 357.

Beilstein, vol. 20, page 531, 4th ed.

Chem. Abstracts, vol. 25, page 704.